United States Patent
Tewari et al.

(10) Patent No.: US 10,048,992 B2
(45) Date of Patent: Aug. 14, 2018

(54) EXTENSION OF SCHEMATIZED XML PROTOCOLS

(75) Inventors: Ashutosh Tewari, Freemont, CA (US); Adrian Dragomir, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 457 days.

(21) Appl. No.: 13/085,504

(22) Filed: Apr. 13, 2011

(65) Prior Publication Data
US 2012/0265798 A1    Oct. 18, 2012

(51) Int. Cl.
 G06F 17/22    (2006.01)
 G06F 9/54    (2006.01)
(52) U.S. Cl.
 CPC .................. G06F 9/541 (2013.01)
(58) Field of Classification Search
 CPC .............................. H04L 67/02; H04L 69/08
 USPC ....... 709/201, 203, 217, 219, 223, 224, 248, 709/230, 236
 See application file for complete search history.

(56) References Cited

U.S. PATENT DOCUMENTS

| | | | |
|---|---|---|---|
| 6,917,935 B2 | 7/2005 | Zwiegincew et al. | |
| 7,356,803 B2 | 4/2008 | Bau, III et al. | |
| 2002/0184264 A1 | 12/2002 | Berg et al. | |
| 2002/0191619 A1* | 12/2002 | Shafer | 370/401 |
| 2003/0041077 A1 | 2/2003 | Davis et al. | |
| 2003/0097306 A1* | 5/2003 | Boucher et al. | 705/26 |
| 2004/0073870 A1 | 4/2004 | Fuh et al. | |
| 2004/0139152 A1* | 7/2004 | Kaler | H04L 63/0435 709/203 |
| 2004/0225629 A1* | 11/2004 | Eder | 706/46 |
| 2005/0071801 A1 | 3/2005 | Jesse et al. | |
| 2006/0005070 A1* | 1/2006 | Zimmer et al. | 714/5 |
| 2006/0031264 A1* | 2/2006 | Bosworth et al. | 707/200 |
| 2006/0047767 A1* | 3/2006 | Dodrill et al. | 709/206 |
| 2006/0235976 A1* | 10/2006 | Chen | G06Q 10/06 709/227 |

(Continued)

OTHER PUBLICATIONS

Varela, et al., "A Scheduling Web Service based on XML-RPC", Retrieved at « http://citeseerx.ist.psu.edu/viewdoc/download-?doi=10.1.1.79.8310&rep=rep1&type=pdf », Oct. 25, 2002, pp. 5.

(Continued)

Primary Examiner — Barbara B Anyan (57) ABSTRACT

An application using one version of a schematized XML protocol communicates with another application using a different version of the schematized XML protocol. The different versions may correspond to different deployments or releases of the protocol. Each application generates messages to be sent using two data sets. A first data set is incorporated into the message using elements available in a standard XML protocol schema. A second data set is incorporated into the message using XML annotation elements. The receiving application processes the message using the schematized XML protocol to parse out the first data set. The receiving application further parses the message to identify the second data set that is carried by enhanced XML annotation elements. Extension or annotations are flexibly added to the XML protocol without requiring the client application to request—or the server application to respond to—a pre-negotiated number or type of annotations.

17 Claims, 6 Drawing Sheets

(56) References Cited

U.S. PATENT DOCUMENTS

| | | | |
|---|---|---|---|
| 2006/0271570 A1* | 11/2006 | Bearden | H04L 67/02 |
| 2007/0150801 A1* | 6/2007 | Chidlovskii et al. | 715/512 |
| 2007/0180144 A1* | 8/2007 | Basu | G06F 17/30908 709/246 |
| 2007/0198989 A1* | 8/2007 | Vernal et al. | 719/313 |
| 2007/0300211 A1* | 12/2007 | Reinhold | 717/140 |
| 2008/0016122 A1* | 1/2008 | Liu | G06F 17/30935 |
| 2008/0101597 A1 | 5/2008 | Nolan et al. | |
| 2009/0037368 A1* | 2/2009 | Petride et al. | 707/2 |
| 2009/0172101 A1* | 7/2009 | Arthursson | 709/205 |
| 2009/0177769 A1* | 7/2009 | Roberts | 709/224 |
| 2010/0195909 A1* | 8/2010 | Wasson et al. | 382/176 |
| 2011/0047230 A1* | 2/2011 | McGee | 709/206 |
| 2011/0060767 A1* | 3/2011 | Agarwal | G06F 17/2247 707/803 |
| 2011/0161341 A1* | 6/2011 | Johnston | 707/766 |

OTHER PUBLICATIONS

"JAX-WS", Retrieved at « http://publib.boulder.ibm.com/infocenter/wasinfo/v6r1/index.jsp?topic=/com.ibm.websphere.wsfep.multiplatform.doc/info/ae/ae/welc6tech_wbs_intro.html », Retrieved Date: Feb. 23, 2011, pp. 4.

* cited by examiner

EXTENSION OF SCHEMATIZED XML PROTOCOLS

BACKGROUND

XML (eXtensible Markup Language) is a flexible, self-descriptive markup language that is designed to transport and store data. The XML language has no predefined tags, so the tags used in XML are defined by the author of an XML document. XML data is stored in plain text format, which makes it easy to create data that can be shared by different applications. XML data can be read by different- and even incompatible-applications, which provides a software- and hardware-independent means for carrying and storing data.

Some application use a schematized version of XML in which the building blocks and structure of an XML document are predefined by a schema. The XML schema may define, for example, the elements and attributes that can appear in a XML document, the data types for the elements and attributes, the use, number and order of child elements, and the like.

The XML schema may use predefined data types to describe allowable document content and to validate the data in an XML document. The XML schema can also provide secure data communication where a sender and receiver use the same schema and both parties use the same description of the XML content and, therefore, have a mutual understanding of the XML content.

However, if an application or protocol using the XML schema is revised, then the XML schema may also need to be revised to support changes in the application or protocol. This requires each application to keep close track of the XML schema version capability of other users to ensure that the data exchanged between users can be understood by the other party. If there are multiple active versions of the XML schema that are in use by various applications, then it becomes complex for the one application to identify the version in use on every other application and to preserve a mapping of the types of data to be sent to each other application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In the case of a client-server application that is following a pre-written XML protocol that uses a schema to format the XML, flexibility of sending and receiving data that is not core part of the schema can be achieved with minimal changes to XML schema. This allows the pre-written or schematized protocol, such as an XML protocol, to be extended to support version and deployment independence. Additionally, the client and server do not need to maintain a complex version-tracking system when an extended XML protocol is used by the applications to communicate. Additionally, they are not restricted to requesting only the extra data that they will understand or to return only the extra data that the other party can understand. A version-independent approach allows the server and client to extend the pre-written schematized XML data transfer protocol to support the most recent version of the protocol and related applications.

The schema that defines of any version of a protocol is extended by the insertion of an XML element named "Annotation." The Annotation element represents extra data or other information that is different from what can be request using a standard request or what can be provided in a standard response in a pre-written protocol. The number and type of such Annotations is unlimited. A server returns the annotations or extra data only in response to Annotations specifically included in a request from a client. As a result, the server does not need to keep track of the current version of the protocol that is in use on the client.

In one embodiment, a client device extends a schematized XML protocol by identifying a first data set that is to be transmitted to a server application. The first data set can be identified using a standard XML protocol schema. The client application also identifies a second data set to be transmitted to the server application. The second data set cannot be defined in the standard XML protocol schema. The client application generates a message comprising the first data set using elements available in the standard XML protocol schema. The message also includes the second data set using XML annotation elements. The message is transmitted to the server application, which process the message and sends a return message. The return message includes a first response data set that is carried using the standard XML protocol schema. The return message also includes a second response data set that is carried using XML annotation elements. The enhanced XML annotation elements carry data that does not correspond to data support in the standard XML protocol schema elements.

In another embodiment, a server application processes schematized XML protocol messages received from a client. The server receives a message from the client application and parses the message using the elements defined in a standard XML protocol schema. The server application identifies a first data set in the message that is carried by the standard XML protocol schema elements. The server application further parses the message to identify a second data set that is carried by enhanced XML annotation elements. The enhanced XML annotation elements carry data that does not correspond to data support in the standard XML protocol schema elements. The server application may generate a response to the received message. The response may include a first return data set that is carried in the response using the standard XML protocol schema elements. The response may further include a second return data set that is carried using XML annotation elements.

DETAILED DESCRIPTION

Figure 1:
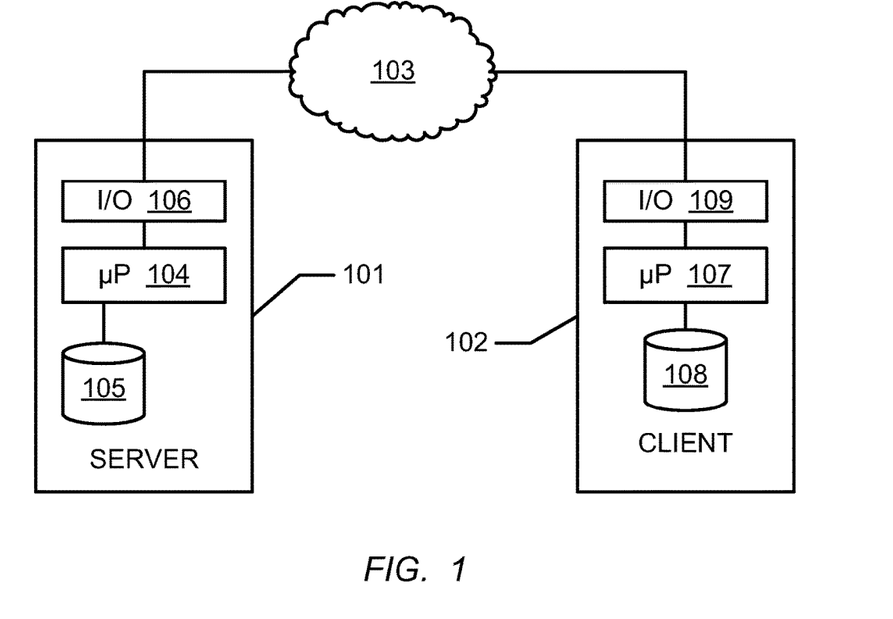
FIG. 1 is a block diagram of a client/server system implementing an extended schematized XML protocol.

FIG. 1 is a block diagram of a client/server system implementing an extended schematized XML protocol. Server 101 and client 102 may communicate via a direct connection, such as by exchanging messages over network 103. Messages exchanged between server 101 and client 102 may include, for example, requests from client 102 and corresponding responses from server 101. Network 103 may be any wireline or wireless connection that is established directly or indirectly between server 101 and client 102. For example, server 101 and client 102 may exchange internet protocol (IP) messages and/or data packets over a proprietary or local area network (LAN), across an Internet or public network, or via a WiFi (IEEE 802.11), WiMAX (IEEE 802.16), Bluetooth, or other wireless network.

Server 101 includes a processor 104 running one or more applications. Processor 104 may be a software-, firmware-, or hardware-based device. Memory 105 may be used to store data and computer program instructions, such as software and firmware used by processor 104, and any other parameters needed by server 101. Memory 105 may be any applicable storage device, such as a fixed or removable RAM, ROM, flash memory, or disc drive that is separate from or integral to processor 104. In other embodiments, memory 105 may by a computer program product, computer-readable or machine-readable storage, DVD or CD. Processor 104 is coupled to memory 105 and to input/output (I/O) device 106, which provides an interface to transmit and receive messages and data packets from network 103.

As used herein, the term application means software or program code or steps that are used to perform one or more specific tasks. The application may operate on its own or may communicate with other applications using, for example, a schematized XML protocol. In one embodiment, a client application exchanges data with a separate server application to perform various tasks, such as synchronization, communication, data storage, etc.

Similarly, client 102 includes a processor 107 running one or more applications. Processor 107 may be a software-, firmware-, or hardware-based device. Memory 108 may be used to store data and computer program instructions, such as software and firmware used by processor 107, and any other parameters needed by client 102. Memory 108 may be any applicable storage device, such as a fixed or removable RAM, ROM, flash memory, or disc drive that is separate from or integral to processor 107. Processor 107 is coupled to memory 108 and to I/O device 109, which provides an interface to transmit and receive messages and data packets from network 103.

Server 101 and client 102 both implement an application that uses a multi-version protocol, such as a communication, data-transfer, or synchronization protocol, that uses schematized XML to exchange data. As long as server 101 and client 102 use the same version of the application and protocol, then the format of the exchanged data, such as request and response messages, will be known to each application. However, if the formats of the request and response messages are modified in a new version of the multi-version protocol, then such request and response can only be used between clients and servers that know how to parse the data.

Using an extended schematized XML protocol, the server 101 and client 102 do not have maintain a mapping of the protocol version used by the other device. Instead, each device only requests the data that it can use and only sends the data that the other device requested. For example, every set of extra data that client 102 desires will be specified individually in a request sent by the client. Upon receiving the request, server 101 will send only the extra data sets that the client has requested and that server 101 understands or can identify. Server 101 ignores any extra requests that it does not understand or that it cannot return. Neither server 101 nor client 102 break, stall or otherwise fail if unknown data sets are requested or received. In this way, backward compatibility does not need to be maintained, nether device needs to know the currently active protocol version that is in use on the other device, and there is no requirement for controlling the order in which the protocol versions are deployed to server 101 or released to client 102.

Figure 2:
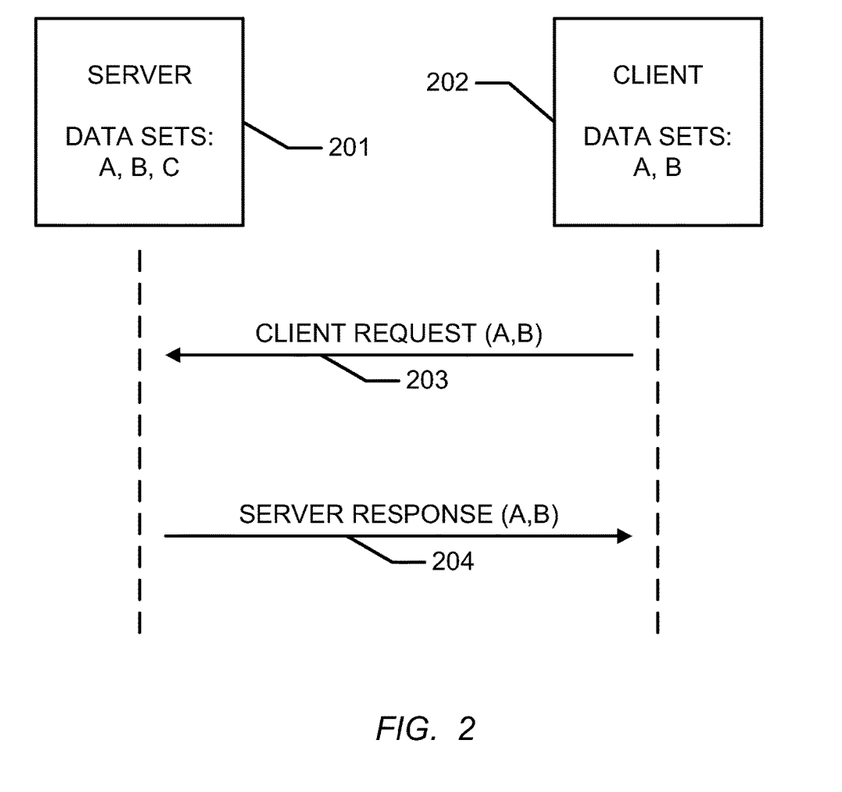
FIG. 2 is a flow chart illustrating the exchange of messages between two applications according to one embodiment of the disclosed protocol.

FIG. 2 is a flow chart illustrating the exchange of messages between two applications according to one embodiment of the disclosed protocol. Server 201 implements a protocol version that implements data sets A, B, and C. Client 202 implements an earlier version of the protocol that implements data sets A and B only. Client 202 sends a request 203 requesting data sets A and B. Server 201 receives the client request 203 and identifies the request for data sets A and B only, even though data set C is also available on server 201. However, server 201 ignores the "missing" request for data set C and collects just data sets A and B to be sent to client 202 in return message 204.

The client request message 203 may be an XML-based message having the following format:

```
<AnyStandardRequest>
    <StandardSchema>
    ...
    </StandardSchema>
    <Annotations>
        <Annotation>
            <Name>A</Name>
        </Annotation>
        <Annotation>
            <Name>B</Name>
        </Annotation>
    </Annotations>
```

The root element <AnyStandardRequestOrResponse> includes two child elements: <StandardSchema> and <Annotations>. The <StandardSchema> element includes child elements that correspond to the standard elements that are available for the protocol, which may include elements known to be available in all versions of the protocol. The <Annotations> element includes child <Annotation> elements that contain elements that are not known in all versions of the protocol. For example, if data sets A and B are not available in the Standard Schema, then those data sets are requested in the <Annotations> element. Using the <Name> element, data sets A and B are identified in the requested Annotations.

The server return message 204 may be an XML-based message having the following format:

```
<AnyStandardResponse>
    <StandardSchema>
    ...
    </StandardSchema>
    <Annotations>
        <Annotation>
            <Name>A</Name>
            <Value>Value of A</Value>
        </Annotation>
```

```
        <Annotation>
            <Name>B</Name>
            <Value>Value of B</Value>
        </Annotation>
    </Annotations>
```

Similar to client request message 203, the root element <AnyStandardRequestOrResponse> includes the two child elements: <StandardSchema> and <Annotations>. The <StandardSchema> element includes child elements that correspond to the information requested by client 202 using standard elements for the protocol. The <Annotations> element includes child <Annotation> elements that contain information responsive to the Annotations requested by client 202. Returned data sets A and B are identified using the <Name> element, and the <Value> element is used to identify the contents of each respective data set.

Data set C was not requested in message 203 of FIG. 2 and, therefore, was not returned in message 204. However, had data set C been included in message 204, client 202 would ignore it and any other Annotations that it did not request or recognize.

Figure 3:
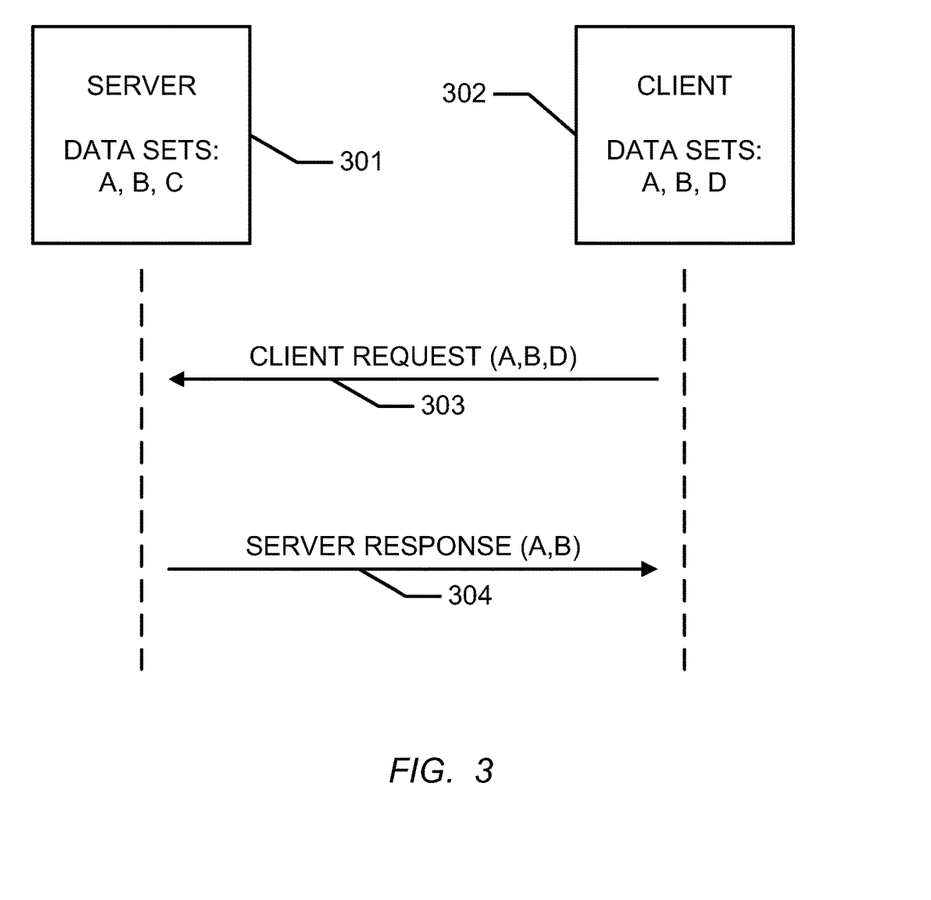
FIG. 3 is a flow chart illustrating the exchange of messages between two applications according to one embodiment of the disclosed protocol.

FIG. 3 is a flow chart illustrating the exchange of messages between two applications according to one embodiment of the disclosed protocol. Server 301 implements a protocol version that implements data sets A, B, and C. Client 302 implements a different version of the protocol, which implements data sets A, B and D. Client 302 sends a request 303 requesting data sets A, B and D. Server 301 receives the client request 303 and identifies the request for data sets A and B, but ignores the request for data set D since it is not supported by the protocol version deployed on server 301. Additionally, server 301 ignores the lack of a request for data set C and collects just data sets A and B to be sent to client 302 in return message 304.

The client request message 303 may be an XML-based message having the following format:

```
    <AnyStandardRequest>
        <StandardSchema>
            ...
        </StandardSchema>
        <Annotations>
            <Annotation>
                <Name>A</Name>
            </Annotation>
            <Annotation>
                <Name>B</Name>
            </Annotation>
            <Annotation>
                <Name>D</Name>
            </Annotation>
        </Annotations>
```

The root element <AnyStandardRequestOrResponse> and child elements <StandardSchema> and <Annotations> operate as described above for FIG. 2. The <Annotations> element includes child <Annotation> elements that contain <Name> elements to identify data sets A, B and D.

The server return message 304 may be an XML-based message having the following format, which is similar to message 204.

```
    <AnyStandardResponse>
        <StandardSchema>
            ...
        </StandardSchema>
```

```
        <Annotations>
            <Annotation>
                <Name>A</Name>
                <Value>Value of A</Value>
            </Annotation>
            <Annotation>
                <Name>B</Name>
                <Value>Value of B</Value>
            </Annotation>
        </Annotations>
```

No Annotation is returned in message 304 for data set C because it was not requested. No Annotation is returned in message 304 for data set D because it is not available on the server 301.

When a client does not send any Annotation in a message, such as in the case of a client running a default or basic protocol, the server will not send any Annotation data and, therefore, the client will not break or stall due to unknown or unexpected data.

When a server does not support any Annotation data, such as in the case of a server running a default or basic protocol, the inclusion of Annotation data in the XML request do not cause the server to break or stall. This case may occur, for example, before a server upgrade to implement the logic to understand and return D is deployed, but a new client version has been released that knows how to use and parse D. For example, in the example above where server only supports data sets A, B, and C, a request including the following do not break the server:

```
    <Annotations>
        <Annotation>
            <Name>A</Name>
        </Annotation>
        <Annotation>
            <Name>B</Name>
        </Annotation>
        <Annotation>
            <Name>C</Name>
        </Annotation>
        <Annotation>
            <Name>D</Name>
        </Annotation>
    </Annotations>
```

Likewise, the following response from the server does not break the client even if the client only requested data sets A, B, C:

```
    <Annotations>
        <Annotation>
            <Name>A</Name>
            <Value>Value of A</Value>
        </Annotation>
        <Annotation>
            <Name>B</Name>
            <Value>Value of B</Value>
        </Annotation>
        <Annotation>
            <Name>C</Name>
            <Value>Value of C</Value>
        </Annotation>
        <Annotation>
            <Name>D</Name>
            <Value>Value of D</Value>
        </Annotation>
    </Annotations>
```

However, this response, which includes D, do not occur in normal operation since the client did not request data set D.

When the client and server follow these design principles, the clients and servers would be resilient to not break each other or otherwise be negatively impacted by a request or response that includes an unknown data set no matter what deployment and/or release pattern was used to update the clients and servers.

Figure 4:
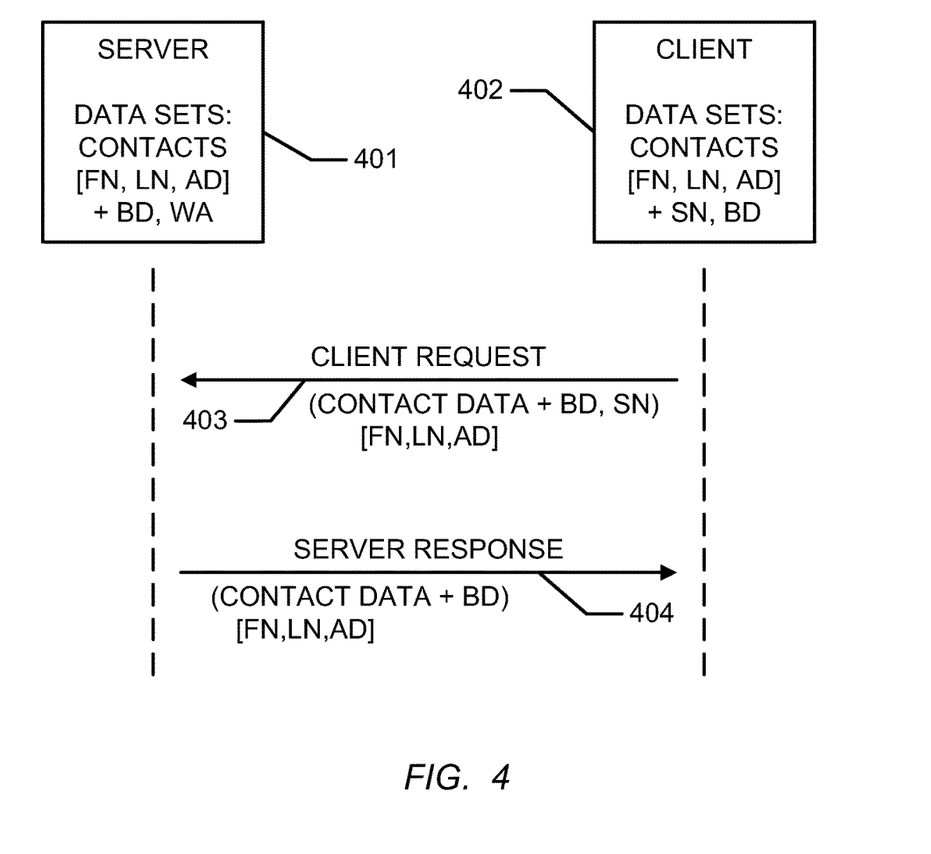
FIG. 4 is a block diagram of a client/server system implementing an extended schematized XML protocol.

FIG. 4 is a block diagram of a client/server system implementing an extended schematized XML protocol. The system of FIG. 4 implements various versions of synchronization protocols to provide a synchronization service between server 401 and client 402. This service enables client 402, which may be a mobile application for example, to access mail, calendar, contacts and tasks data from server 401.

Server 401 may want to return a particular data set to client 402 that is not part of the standard synchronization protocol. Client 402 expects data in a certain format that is specific to the version of the synchronization protocol that it is implementing. If that particular data is returned to all clients, then client 402 may not know how to parse and use the data, and hence client 402 will break or stall. Various versions of the client may be interested in and understand various sets of extra mail, calendar, contacts and task data. However, it would be is complex and unsustainable to maintain a mapping of each clients' versioning at the server side so that the data returned the clients' is specific to a particular synchronization protocol version.

Any version of the synchronization protocol can be extended with the insertion of an XML element "Annotation" as described herein. The Annotation element represents any "extra data," which is data that is extra or other than what can be requested in a standard synchronization request or can be returned in a standard synchronization response.

The number of such Annotations and type of such Annotations is boundless. The synchronization server 401 returns Annotations with the extra data only in response to clients 402 that have specifically asked for that data by using Annotations in a request message. The synchronization protocol implements this solution to pass data in a field that only clients that have negotiated and asked for the data will receive the data.

FIG. 4 also illustrates messages exchanged between the synchronization server 401 and the client 402. The server 401 implements the synchronization protocol, which uses schematized XML to send request from clients and responses from the server. Since there is no provision in the synchronization protocol to send or request any extra data that is not supported in the protocol, the XML implementation disclosed herein extends the synchronization protocol to enable it to pass extra data between client 402 and server 401 using Annotations and name/value pairs. A generic example of such message flow would be:

```
<AnyStandardRequestOrResponse>
    <StandardSchema>
        ...
    </StandardSchema>
    <Annotations>
        <Annotation>
            <Name>[Annotation-1-Name]</Name>
            <Value>[Annotation-1-Value]</Value>
        </Annotation>
        ...
        <Annotation>
            <Name>[Annotation-n-Name]</Name>
            <Value>[Annotation-n-Value]</Value>
        </Annotation>
    </Annotations>
</AnyStandardRequestOrResponse>
```

Using this mechanism, server 401 and client 402 can implement any version of the synchronization protocol and can easily pass extra data to each other without regard of the synchronization protocol version deployed on either application. The number of such Annotations instances in an XML message is unlimited, and the existence of an Annotations block in the XML messages is optional. The synchronization protocol schema is extended to allow the Annotations to pass through the validation system. However, since format of the request and response is modified, such request and response is useful only for clients that know how to parse it.

If multiple versions of the client synchronization protocol are interested in receiving different sets of data, then it becomes a complex problem for server 401 to identify each client 402 and to preserve a mapping of client versions to desired sets of Annotations that server 401 sends to client 402. For this reason, the server 401 does not rely on logic that is based on knowing the client's synchronization protocol version to select the necessary extra data to be sent. Instead, server 401 sends only the data that the client requests. For every set of extra data (or Annotation) that is of interest to client 402, the client individually specifies what data it wants. Once server 401 sees the request, it sends only those sets of extra data that client 402 has requested.

Further, server 401 ignores any extra Annotation request that it does not understand or that it cannot return. Also, the client 402 does not break if extra Annotations are sent by server 401. In this way, there is no need to maintain backward compatibility among protocol versions, and there is no need to follow a particular order between a server deployment and client release.

Using this mechanism, server 401 and client 402 can implement any version of the synchronization protocol and can easily pass extra data to each other without regard of the synchronization version deployed on either application. The number of such Annotations instances in an XML message is unlimited. The existence of an annotations block in the XML messages is optional. The synchronization schema is extended to allow the Annotations to pass through the validation system. However, since format of the request and response is modified, such request and response is sent to clients that know how to parse it.

If multiple versions of the client synchronization protocol are interested in receiving different sets of data, then it becomes a complex problem for server 401 to identify each client 402 and to preserve a mapping of client versions to desired sets of Annotations that server 401 sends to client 402. For this reason, the server 401 does not rely on logic that is based on knowing the client's synchronization protocol version to select the necessary extra data to be sent. Instead, server 401 sends only the data that the client requests. For every set of extra data (or Annotation) that is of interest to client 402, the client individually specifies what data it wants. Once server 401 sees the request, it sends only those sets of extra data that client 402 has requested.

Further, server 401 ignores any extra Annotation request that it does not understand or that it cannot return. Also, the client 402 does not break if extra Annotations are sent by server 401. In this way, there is no need to maintain backward compatibility among protocol versions, and there is no need to follow a particular order between a server deployment and client release.

In the example illustrated in FIG. 4, synchronization protocol version X is deployed on server 401. Protocol version X supports standard contact data First Name (FN), Last Name (LN), and Address (AD) and extra contact data Birthday (BD) and Work Address (WA), which may have been added in version X, but is not available in all versions of the synchronization protocol. Client 402 is using synchronization protocol version Y, which may have been released before or after version X was deployed. Version Y also supports standard contact data First Name (FN), Last Name (LN), and Address (AD) and extra contact data Birthday (BD). In addition, instead of supporting extra contact data Work Address (WA), version Y supports extra data set Spouse Name (SN).

Using message 403, client 402 requests synchronization data from server 401. In particular, client 402 requests updated standard contact data and extra data Birthday and Spouse Name. Using Annotations in the XML protocol, client synchronization request message 403 may include the following elements:

```
<StandardSyncRequest>
    <StandardSyncSchema>
        <Contact Data>
            <FN>First Name</FN>
            <LN>Last Name</LN>
            <AD>Address</AD>
        </Contact Data>
        ...
    </StandardSyncSchema>
    <Annotations>
        <Annotation>
            <Name>BD</Name>
            <Name>SN</Name>
        </Annotation>
        ...
    </Annotations>
</StandardSyncRequest>
```

Synchronization protocol version X deployed on server 401 does not understand the data Spouse Name, so server 401 ignores that request. However, server 401 does understand the data Birthday, so it returns that extra data set. In addition, server 401 does not care, and therefore ignores, the lack of a request for the Work Address extra data in message 403.

Server 401 generates synchronization response message 404, which may include the following elements:

```
<StandardSyncResponse>
    <StandardSyncSchema>
        <Contact Data>
            <FN>First Name</FN>
            <LN>Last Name</LN>
            <AD>Address</AD>
        </Contact Data>
        ...
    </StandardSyncSchema>
    <Annotations>
        <Annotation>
            <Name>BD</Name>
            <Value>Birthday</Value>
        </Annotation>
        ...
    </Annotations>
</StandardSyncResponse>
```

Server 401 does not send the Work Address data because it was not requested by the client 402. If server 401 did send an Annotation with the Work Address data, client 402 would ignore the unrequested Work Address data.

Although the example of FIG. 4 is directed to a synchronization protocol for purposes of illustration, it will be understood that the extensions to the XML protocol as described herein would apply to any schematized XML protocol and not intended to be limited to synchronization, which serves merely as an example application type.

Although the terms "Annotations"/"Annotation" are used as the XML elements that allow for the exchange of extra data in a highly schematized XML protocol, it will be understood that any other name or term can be used as for the extra-data element, as long as the name or term is not already designated in the XML protocol for another element. "Annotations" is just an example that is selected to indicate "extra data." Any other term, such as "ExtraData," "Extension," or "ExtendedData," for example, may be used instead of "Annotations" since the actual name of the "extra data" element is not important.

Additionally, although the terms "server" and "client" are used in the example embodiments above, it will be understood that the extended schematized XML protocol disclosed herein can be used for communications between any two applications. As used in the description herein, the term "client" refers broadly to an application that is generating a request to another application. The term "server" as used herein refers broadly to an application that receives the request and that prepares a response based upon that request. It will be understood that in practice a server may request information from a client using a XML protocol and that extra data may be requested by the server and provided by the client using an extended XML protocol with Annotations.

The XML protocol extension Annotations are not limited to use in a request/response transaction between applications. The XML protocol extension Annotations may also be used to exchange or carry other information, status or parameters between the applications. Moreover, the XML protocol extension Annotations do not have to be used in a two-transaction. XML Annotations may be used to carry data from one application to another in a message that may or may not be acknowledged by the receiving application. For example, a protocol release used on a first application may include standard XML elements that allow the first application to indicate to other applications that it is in an "on" state or is active. The protocol release on the first application may also allow for extra information, such as an estimated battery life. The first application may periodically send a registration or other message to a second application that identifies an active status using the standard XML protocol and that includes battery life data using XML Annotations. The receiving second application may understand and process the battery life data identified using XML Annotations, or it may ignore the battery life data if that features is not included in the protocol deployed on the second application. In either case, the second application does not need to specifically acknowledge the status or battery life data, but may instead merely acknowledge receipt of the message.

Figure 5:
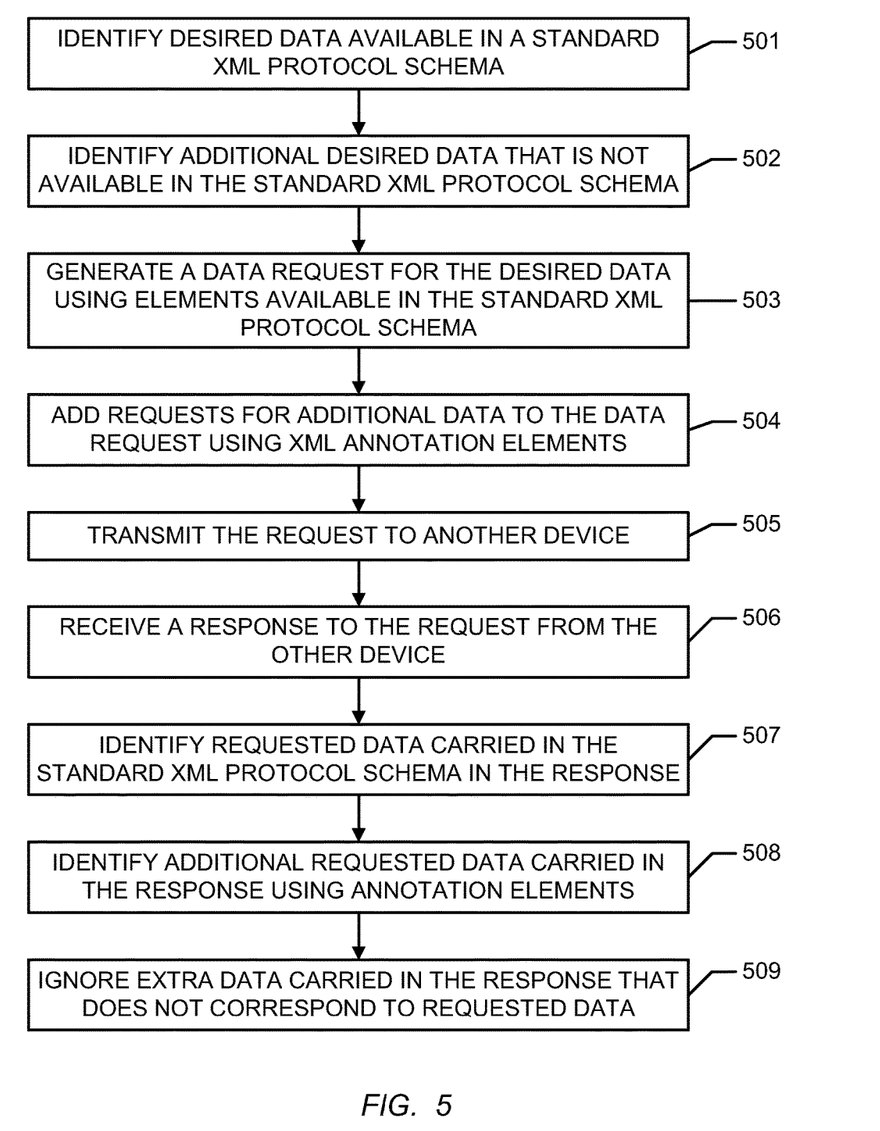
FIG. 5 is a flowchart illustrating a method for one application to request extra data from another application.

FIG. 5 is a flowchart illustrating a method for an application, such as a client application, to request extra data from another application, such as a server application, in a schematized XML protocol. In step 501, the requesting application identifies desired data that it wants to obtain from the other application and that can be identified using a standard XML protocol schema. In step 502, the requesting application also identifies additional data that it desires to obtain from the other application, but that cannot be identified using the definitions in the standard XML schema. The requesting application generates a request for the desired data in step 503. The request for the desired data uses the elements available for the XML protocol in the standards schema.

In step 504, the requesting application adds requests for additional data to the data request using XML Annotation elements. The request is then transmitted to the other application in step 505, and a response is received in step 506. The requesting application then analyzes the response in step 507 and identifies requested data that has been carried using the standard XML protocol schema. In step 508, the requesting application identifies additional requested data that has been carried in the response using Annotation elements. If the response includes further extra data, then the requesting application ignores this data in step 509 if it has not been requested.

It will be understood that steps 501-509 of the process illustrated in FIG. 5 may be executed simultaneously and/or sequentially. It will be further understood that each step may be performed in any order and may be performed once or repetitiously.

Figure 6:
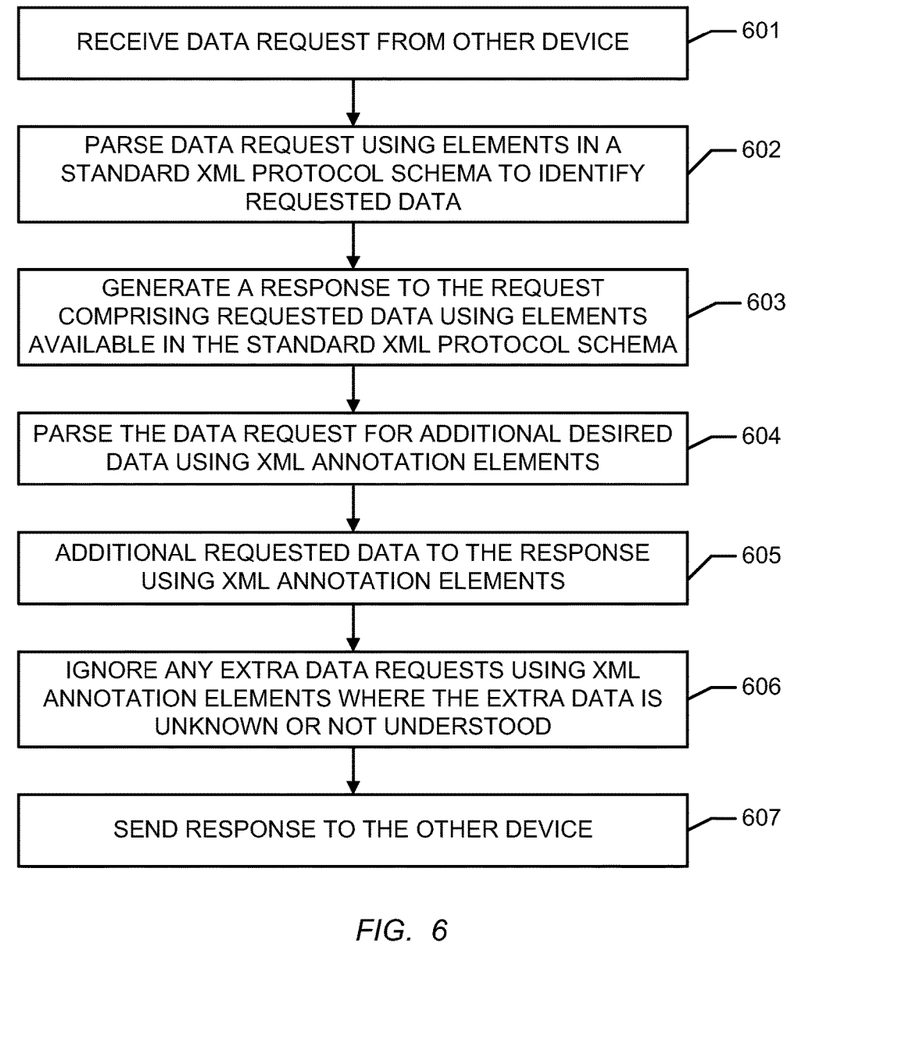
FIG. 6 is a flowchart illustrating a method for one application to respond to a request for extra data from another application.

FIG. 6 is a flowchart illustrating a method for an application, such as a server application, to respond to a request for extra data from another application, such as a client application, in a schematized XML protocol. In step 601, the application receives a data request from the requesting application. In step 602, the application parses the data request using the elements defined in the standard XML protocol schema to identify what data has been requested by the requesting application. The application generates a response to the request message. The response includes the data that was requested using the elements in the standard XML protocol schema.

In step 604, the application further parses the request to identify any additional data that was requested using enhanced XML Annotation elements. The additional requested data is added to the response message in step 605 using XML Annotation elements, such as Name and Value elements. In step 606, the application ignores any extra data requests that are included in the XML Annotations if the extra data is not understood or not supported by the protocol version that is deployed on the application. Finally, in step 607, the response with the data identified using either standard XML elements or XML Annotations is sent to the requesting application.

It will be understood that steps 601-607 of the process illustrated in of FIG. 6 may be executed simultaneously and/or sequentially. It will be further understood that each step may be performed in any order and may be performed once or repetitiously.

Note that many of the functions described herein may be implemented in hardware, software, and/or firmware, and/or any combination thereof. When implemented in software, code segments perform the necessary tasks or steps. The program or code segments can be stored in a processor readable medium. The processor readable medium may include any medium that can store or transfer information. Examples of such a processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, an intranet, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for extending a schematized XML protocol, comprising:
generating, by a client application on a client processor, a request message specifying first data supported by a first version of the XML protocol schema, and comprising an annotation specifying second data supported by a second version of the XML protocol schema, wherein the client application implements the first version of the XML protocol schema and the second version of the XML protocol schema;
transmitting the message to a server application, wherein the server application implements the first version of the XML protocol schema and a third version of the XML protocol schema, wherein the third version of the XML protocol schema supports third data, and wherein at least a portion of the second data supported by the second version of the XML protocol schema is the same as at least a portion of the third data supported by the third version of the XML protocol schema;
receiving a response to the request message from the server application;
identifying returned data in the response, the returned data corresponding to the first data and the portion of the second data that is the same as a portion of the third data.

2. The method of claim 1, further comprising:
ignoring, by the client application, data in the response that was not requested in the request message.

3. The method of claim 1, wherein the first version XML protocol schema includes XML elements that are known in all versions of the schema.

4. The method of claim 1, wherein XML annotations are used to specify second data that does not correspond to elements defined in the first version of the XML protocol schema.

5. The method of claim 1, wherein the message comprising the first data and the second data is a request for synchronization data.

6. The method of claim 1, wherein the response comprises synchronization data requested in the message comprising the first data and the second data.

7. The method of claim 1, wherein the message comprising the first data and the second data is a status message.

8. A method for processing messages using an extended schematized XML protocol, comprising:
receiving, at a server application on a server processor, a message from another application, the message specifying first data supported by a first version of the XML protocol schema, and comprising an annotation specifying second data supported by a second version of the XML protocol schema, wherein the server application deploys a third version of the XML protocol schema that supports third data;
parsing the message, by the server application on the server processor, using the first version of the XML protocol schema to identify first message data;
parsing the message annotation, by the server application on the server processor, to identify the second data; and identifying a portion of the second data that is the same as a portion of the third data.

9. The method of claim 8, further comprising:
generating, by the server application, a return message comprising first return data using first version of the XML protocol schema, and comprising second return data using XML annotation elements.

10. The method of claim 9, wherein the message from the other application is a request for synchronization data, and wherein the return message is a response that comprises requested synchronization data.

11. The method of claim 9, wherein the second return data is carried in XML annotation elements that identify name and value parameters for the second return data.

12. The method of claim 8, wherein the message from the other application is a status message.

13. The method of claim of claim 8, further comprising:
identifying extra data carried by enhanced XML annotation elements;
determining, by the server application, that the extra data is not supported by the third version of the XML protocol schema deployed on the server application; and
ignoring the extra data.

14. A computer-readable storage memory device comprising instructions for processing messages using an extended schematized XML protocol, wherein the instructions, when executed, cause a processor to:
identify first data to be transmitted to another device, the first data supported by a first version of the XML protocol schema;
identify second data to be transmitted to the another device, the second data supported in a second version of the XML protocol schema; and
generate a message specifying first data supported by a first version of the XML protocol schema, and comprising an annotation specifying the second data;
transmitting the message to a server application, wherein the server application implements the first version of the XML protocol schema and a third version of the XML protocol schema, wherein the third version of the XML protocol schema supports third data, and wherein at least a portion of the second data is the same as at least a portion of the third data;
receiving a response to the request message from the server application;
identifying returned data in the response, the returned data corresponding to the first data and the portion of the second data that is the same as a portion of the third data.

15. The computer-readable storage memory of claim 14, further comprising instructions that, when executed, cause a processor to:
receive a new message from the another device;
parse the new message using the elements defined in the first version of the protocol schema to identify first data; and
parse the new message to identify second data carried by the XML annotation elements.

16. The computer-readable storage memory of claim 15, further comprising instructions that, when executed, cause a processor to:
generate a return message in response to the new message comprising first return data using elements available in the first version of the XML protocol schema, and comprising second return data using XML annotation elements.

17. The computer-readable storage memory of claim 14, wherein the message is a request for synchronization data, and wherein the response is a message that comprises requested synchronization data.

* * * * *